US012798545B2

(12) United States Patent
Wesolowski et al.

(10) Patent No.: US 12,798,545 B2
(45) Date of Patent: Nov. 17, 2026

(54) SYSTEM AND METHOD FOR CHARACTERIZING A CLUTCH

(71) Applicant: Dana Automotive Systems Group, LLC, Maumee, OH (US)

(72) Inventors: Steven J. Wesolowski, Waterville, OH (US); Amar Nivarthi, Canton, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 19 days.

(21) Appl. No.: 19/013,472

(22) Filed: Jan. 8, 2025

(65) Prior Publication Data

US 2025/0145141 A1 May 8, 2025

Related U.S. Application Data

(62) Division of application No. 18/497,516, filed on Oct. 30, 2023, now abandoned, which is a division of application No. 16/794,675, filed on Feb. 19, 2020, now Pat. No. 11,891,042.

(51) Int. Cl.

| | |
|---|---|
| ***B60W 10/08*** | (2006.01) |
| ***B60K 6/38*** | (2007.10) |
| ***B60L 7/10*** | (2006.01) |
| ***B60W 10/11*** | (2012.01) |
| ***B60W 30/18*** | (2012.01) |

(Continued)

(52) U.S. Cl.

CPC ............... *B60W 10/11* (2013.01); *B60K 6/38* (2013.01); *B60W 10/08* (2013.01); *B60W 30/18127* (2013.01); *B60L 7/10* (2013.01); *B60W 2510/0208* (2013.01); *B60W 2510/083* (2013.01); *B60W 2710/023* (2013.01); *B60W 2710/081* (2013.01); *F16D 41/04* (2013.01); *F16D 41/069* (2013.01); *F16D 2500/1064* (2013.01); *F16D 2500/50236* (2013.01); *F16D 2500/50281* (2013.01); *F16D 2500/7041* (2013.01)

(58) Field of Classification Search

CPC ... F16D 2500/1023; F16D 2500/10412; F16D 2500/1064; F16D 2500/3026; F16D 2500/30412; F16D 2500/30421; F16D 2500/3065; F16D 2500/50236; F16D 2500/50245; F16D 2500/50251–50263; F16D 2500/50281

See application file for complete search history.

(56) References Cited

U.S. PATENT DOCUMENTS

| | | | |
|---|---|---|---|
| 11,148,526 | B2 | 10/2021 | Engerman |
| 11,235,660 | B2 | 2/2022 | Engerman |
| 11,236,804 | B2 | 2/2022 | Engerman et al. |

(Continued)

FOREIGN PATENT DOCUMENTS

| | | | | |
|---|---|---|---|---|
| DE | 102016125003 A1 * | 6/2018 | ............. | F16D 48/06 |
| FR | 2920383 A1 | 3/2009 | | |

*Primary Examiner* — John Olszewski
*Assistant Examiner* — Aimee Tran Nguyen
(74) *Attorney, Agent, or Firm* — McCoy Russell LLP

(57) ABSTRACT

Methods and systems for operating a clutch of an axle are provided. In one example, the clutch may be characterized in static or dynamic conditions. The clutch characterization may be a basis for subsequently operating the clutch during gearbox shifting. In particular, an amount of torque that is transferred via the clutch may be controlled or adjusted according to the clutch characterization.

5 Claims, 9 Drawing Sheets

(51) Int. Cl.
*F16D 41/04* (2006.01)
*F16D 41/069* (2006.01)

(56) References Cited

U.S. PATENT DOCUMENTS

| | | | | |
|---|---|---|---|---|
| 11,440,417 | B2 | 9/2022 | Nahrwold et al. | |
| 11,480,222 | B2 | 10/2022 | Engerman | |
| 11,518,225 | B2 | 12/2022 | Engerman | |
| 11,577,604 | B2 | 2/2023 | Engerman | |
| 11,661,066 | B2 | 5/2023 | Nahrwold | |
| 2014/0202821 | A1 | 7/2014 | Schotten | |
| 2016/0023650 | A1 | 1/2016 | Jiang et al. | |
| 2017/0067518 | A1 | 3/2017 | Hodrus | |
| 2017/0166196 | A1* | 6/2017 | Park | B60W 20/40 |
| 2017/0343064 | A1* | 11/2017 | Lienhard | F16D 48/06 |
| 2019/0226409 | A1 | 7/2019 | Hoffman et al. | |
| 2021/0252976 | A1 | 8/2021 | Nahrwold | |
| 2022/0025942 | A1* | 1/2022 | Enders | B60W 10/08 |

* cited by examiner

SYSTEM AND METHOD FOR CHARACTERIZING A CLUTCH

CROSS REFERENCE TO RELATED APPLICATION

The present application is a divisional of U.S. Non-Provisional patent application Ser. No. 18/497,516, entitled "SYSTEM AND METHOD FOR CHARACTERIZING A CLUTCH", and filed on Oct. 30, 2023. U.S. Non-Provisional application Ser. No. 18/497,516 is a divisional of U.S. Non-Provisional patent application Ser. No. 16/794,675, entitled "SYSTEM AND METHOD FOR CHARACTERIZING A CLUTCH", and filed on Feb. 19, 2020. The entire contents of the above-listed applications are hereby incorporated by reference for all purposes.

FIELD

The present disclosure relates to operating a clutch of a driveline. The system and method may applicable to axles that include a gearbox having two or more gear ranges.

BACKGROUND AND SUMMARY

A vehicle may include one or more clutches that may be selectively engaged and disengaged via a clutch actuator. The clutch may include plates that may vary in thickness from one vehicle to the next vehicle. In addition, there may be differences in the clutch actuator from one vehicle to the next vehicle. Consequently, a position of the clutch actuator where the clutch first begins to transfer torque may be inconsistent from vehicle to vehicle. If this inconsistency is not compensated, some vehicles may experience slightly longer shifting sequences, while other vehicles may experience higher levels of clutch wear depending on how the vehicle's shifting sequence is performed. Therefore, it may be desirable to provide a way of determining a position of a clutch actuator where a clutch being activated by the clutch actuator begins to transfer torque. This actuator position may be referred to as a "kiss" position since it may coincide with where clutch plates and pads begin to touch and transfer torque.

The inventors herein have recognized the above-mentioned issues and have developed a method for operating a vehicle powertrain, comprising: adjusting a relationship between a clutch actuator position and a torque capacity of a clutch in response to an amount of torque generated via an electric machine being less than a threshold; and operating the clutch according to the relationship.

By adjusting a relationship between a clutch actuator position and a torque capacity of a clutch in response to an amount of torque generated via an electric machine being less than a threshold, it may be possible to identify a clutch actuator position at which a clutch begins to transfer torque, thereby identifying the "kiss" position. For example, if a vehicle is decelerating and an electric machine of the vehicle is in a regeneration mode where the electric machine supplies charge to an electric energy storage device, a fully closed clutch may be opened via the clutch actuator moving at a predetermined rate. The electric machine may continue to generate charge as long as torque is supplied to the electric machine via the clutch and the vehicle's wheels. However, the electric machine may cease generating charge when the clutch ceases to transfer torque from the vehicle's wheels to the electric machine. The position of the clutch actuator at which torque ceases to be transferred to the electric machine may be identified by output of the electric machine.

The present description may provide several advantages. In particular, the approach may improve gear shifting. In addition, the approach may be applied to different vehicles so that variations in clutches and clutch actuators may be compensated. Further, the approach may be carried out in several different ways that may have their own advantages.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1A:
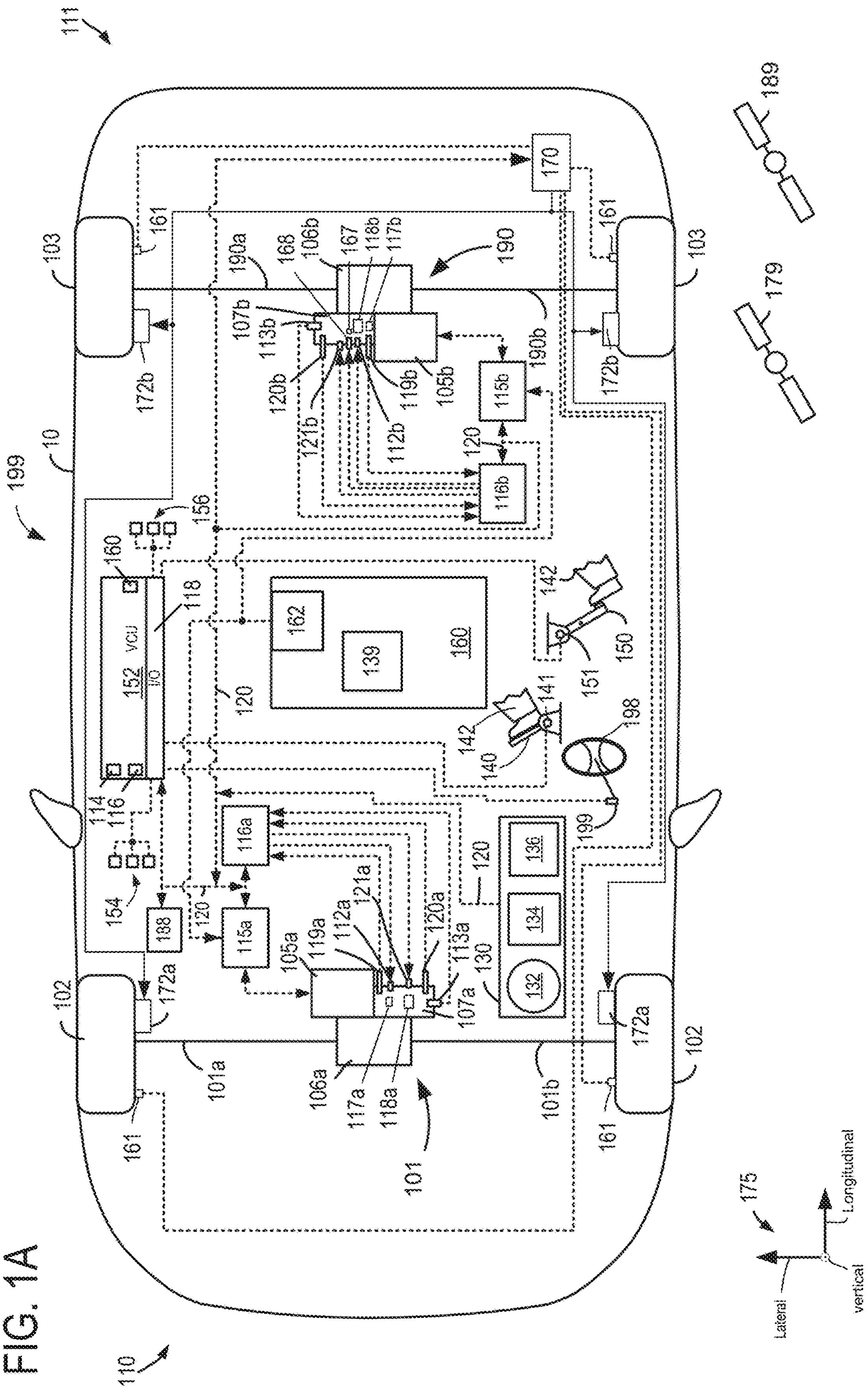
FIG. 1A is a schematic diagram of a vehicle powertrain.
Figure 2:
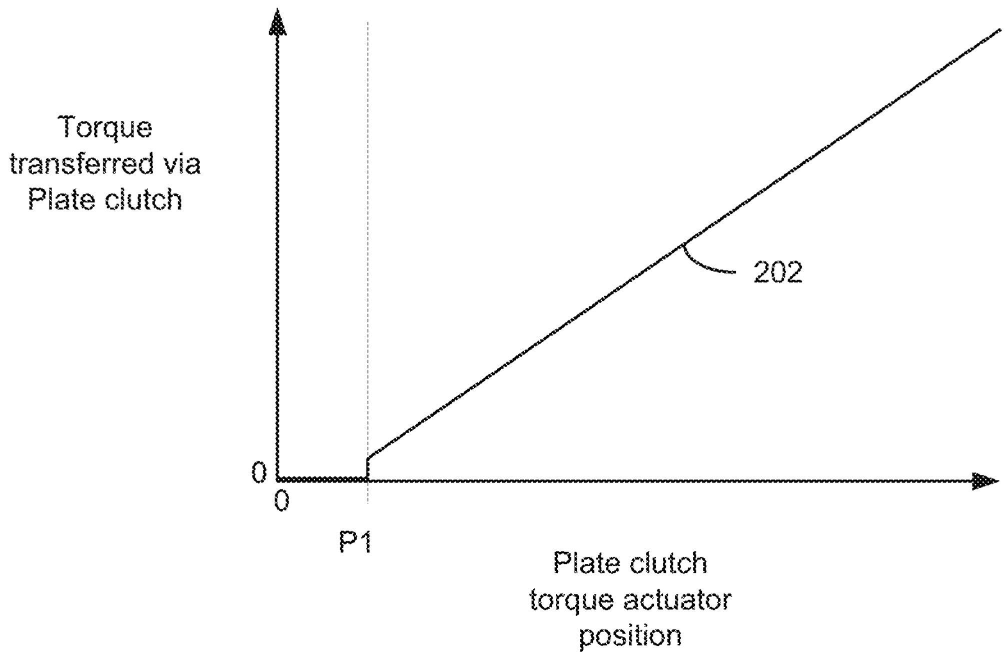
FIG. 2 is a plot of an example relationship between a clutch actuator position and an amount of torque that may be transferred via a clutch.
Figure 3:
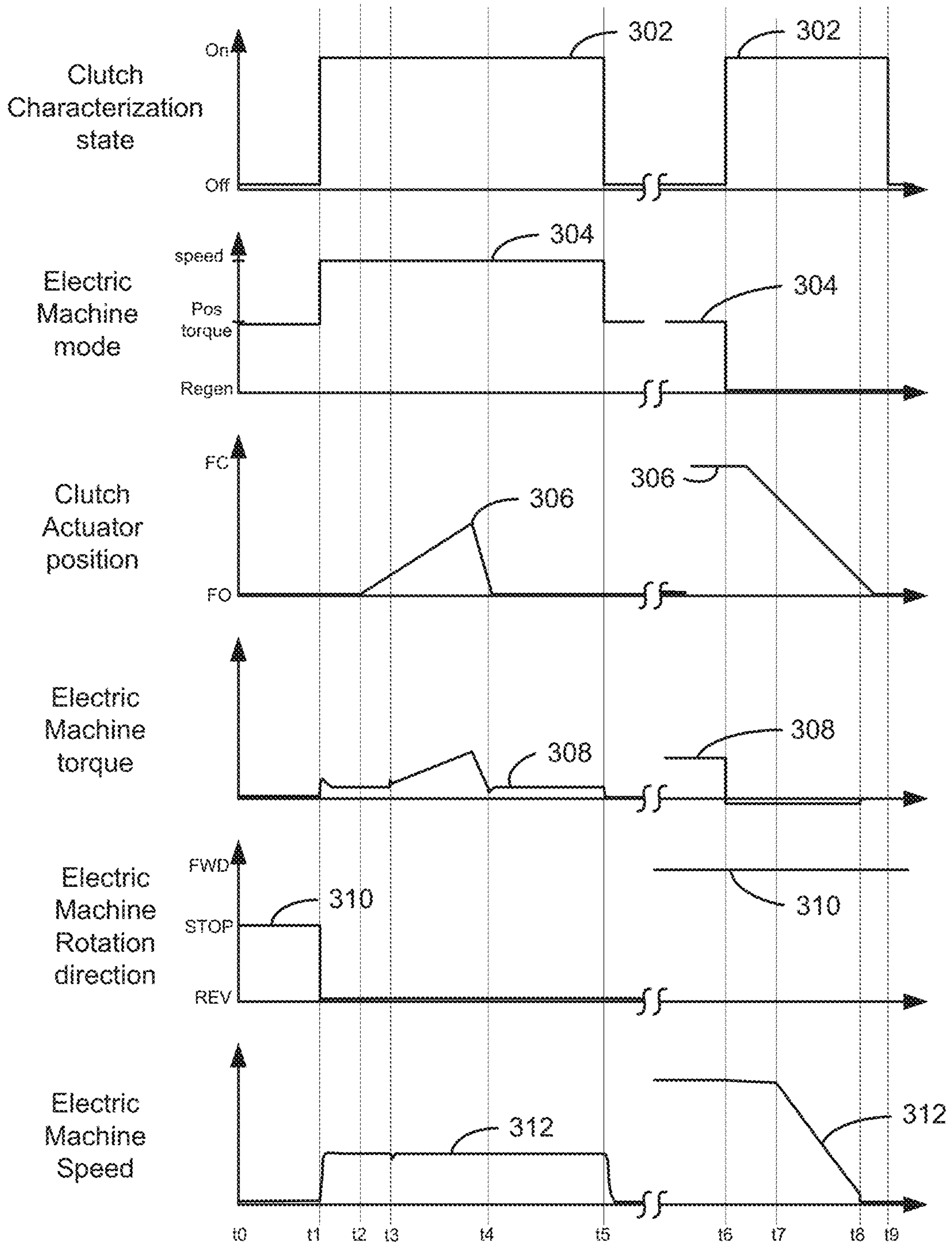
FIG. 3 shows an example powertrain operating sequence according to the method of FIGS. 4 and 5.
Figure 4:
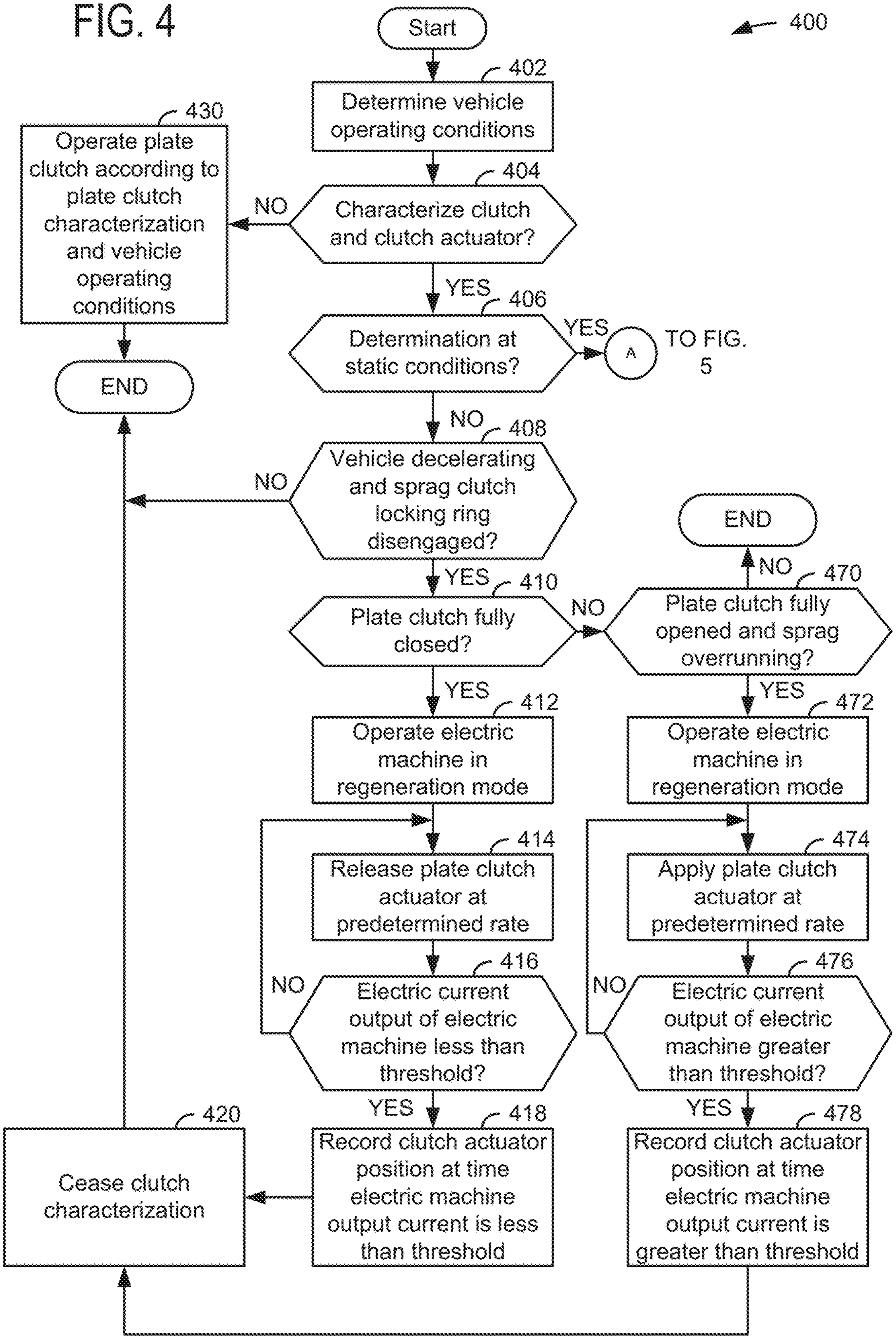
FIGS. 4 and 5 show an example method for operating a driveline clutch is shown.
Figure 5:
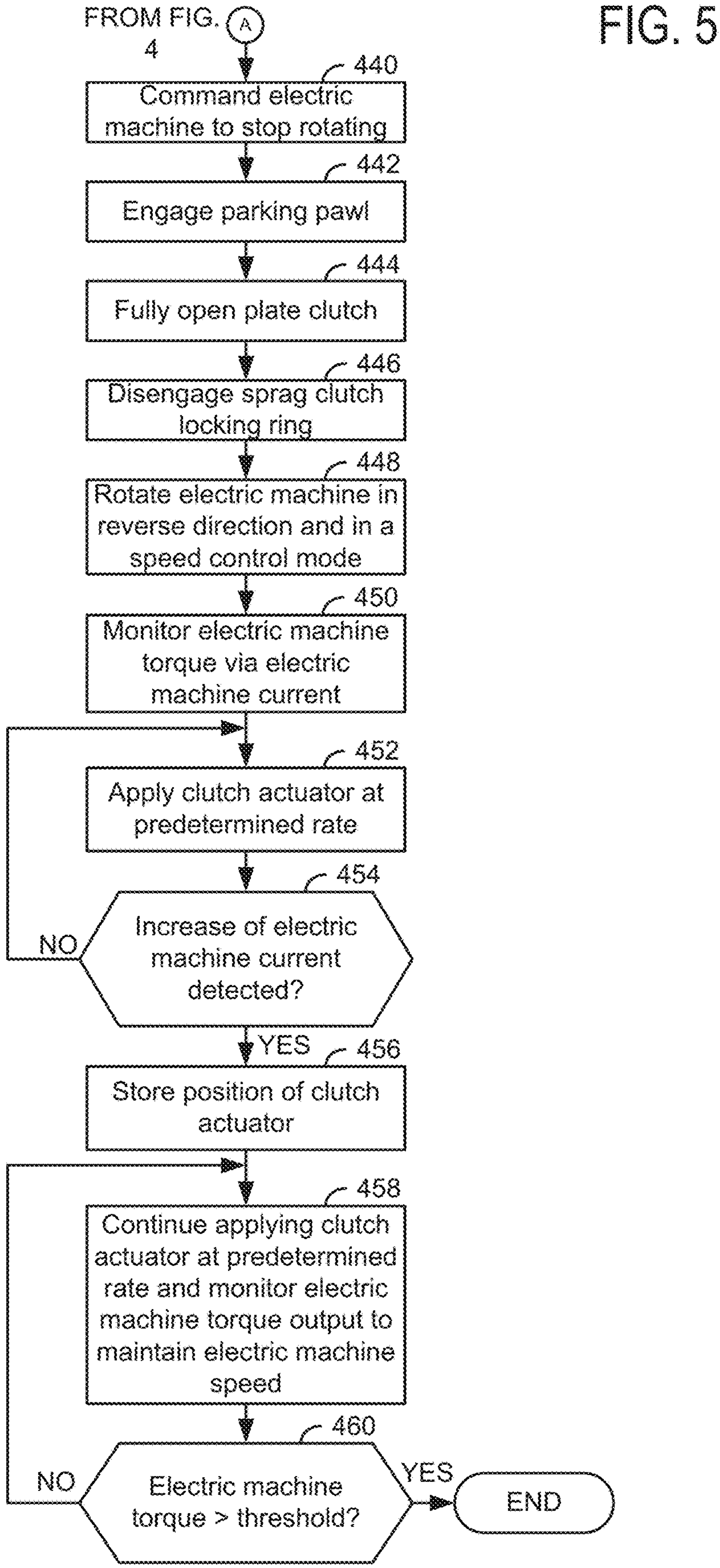

The following description relates to systems and methods for operating a clutch included in powertrain of a vehicle. The powertrain may include one or more electric machines that may selectively provide power to propel the vehicle. The one or more electric machines may also selectively operate in a regeneration mode whereby the electric machines may convert mechanical energy into electrical energy. Operation of the clutch may be adapted to improve gear shifting. FIG. 1A shows an example powertrain that includes clutches in axles. The clutch may be incorporated into an axle structure as shown in FIGS. 1B-1E. The clutch may transfer torque as shown in the plot of FIG. 2. Operation of the clutch may be characterized as shown in the sequence of FIG. 3. A method for characterizing a driveline clutch is shown in FIGS. 4 and 5.

FIG. 1A illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 includes at two propulsion sources 105*a* and 105*b*. In one example, propulsion sources 105*a* and 105*b* may be electric machines that may operate as motors or generators. In another example, one of propulsion sources 105*a* and 105*b* may be an internal combustion engine and the other of propulsion sources 105*a* and 105*b* may be an electric machine. Thus, vehicle propulsion system 199 may be an electric vehicle or a hybrid vehicle. If one of propulsion sources 105*a* or 105*b* is an internal combustion engine, the internal combustion engine may consume liquid or gaseous fuel. Both or one of propulsion sources 105*a* and 105*b* may consume and/or generate electrical power depending on their operating mode. Throughout the description of FIG. 1A, mechanical connections and hydraulic connections between the various components are illustrated as solid lines, whereas electrical connections between various components are illustrated as dashed lines.

Vehicle propulsion system 199 includes a front axle 101 and a rear axle 190. Rear axle 190 comprises two half shafts, including a first or right haft shaft 190*a* and a second or left half shaft 190*b*. Likewise, front axle 101 comprises a first or right half shaft 101*a* and a second or left half shaft 101*b*. Vehicle propulsion system 199 further includes front wheels 102 and rear wheels 103. Front wheels 102 may be selectively driven via propulsion source 105*a* and rear wheels 103 may be selectively drive via propulsion source 105*b*. Thus, propulsion system 199 may operate in a four wheel drive mode or a two wheel drive mode.

The rear axle 190 may be an integrated axle that includes a differential 106*b*, gearbox 107*b*, and propulsion source 105*b*. Alternatively, propulsion source 105*b* and gearbox 107*b* may be separate from rear axle 190. Gearbox 107*b* includes a first speed sensor 119*b* for sensing an input shaft speed, a second speed sensor 120*b* for sensing a transmission output shaft speed, a clutch actuator 112*b*, a sprag clutch lock ring actuator 121*b*, a sprag clutch 117*b*, and a clutch position sensor 113*b*. Gearbox 107*b* may include a parking pawl 167 to selectively prevent rotation of a transmission output shaft of gearbox 107*b*. The parking pawl may be engaged and disengaged via parking pawl actuator 168. In examples where propulsion source 105*b* is an electric machine, electric power inverter 115*b* is electrically coupled to propulsion source 105*b*. A transmission control unit 116*b* is electrically coupled to sensors and actuators of gearbox 107*b*.

Propulsion source 105*b* may transfer mechanical power to or receive mechanical power from gearbox 107*b*. As such, gearbox 107*b* may be a two speed gearbox that may shift between gears when commanded via transmission control unit 116*b*. Gearbox 107*b* may transfer mechanical power to or receive mechanical power from differential 106*b*. Differential 106*b* may transfer mechanical power to or receive mechanical power from wheels 103 via right half shaft 190*a* and left half shaft 190*b*. Propulsion source 105*b* may consume alternating current (AC) electrical power provided via electrical inverter 115*b*. Alternatively, propulsion source 105*b* may provide AC electrical power to electrical inverter 115*b*. Electrical power inverter 115*b* may be provided with high voltage direct current (DC) power from electrical energy storage device 160 (e.g., a traction battery or a traction capacitor). Electric power inverter 115*b* may convert the DC electrical power from electrical energy storage device 160 into AC electrical power for propulsion source 105*b*. Alternatively, electrical power inverter 115*b* may be provided with AC power from propulsion source 105*b*. Electric power inverter 115*b* may convert the AC electrical power from propulsion source 105*b* into DC power to store in electrical power storage device 160.

Energy storage device 160 may periodically receive electrical energy from a power source such as a stationary power grid (not shown) residing external to the vehicle (e.g., not part of the vehicle). As a non-limiting example, vehicle propulsion system 199 may be configured as a plug-in electric vehicle (EV), whereby electrical energy may be supplied to energy storage device 160 via the power grid (not shown).

Electric energy storage device 160 includes an electric energy storage device controller 139 and an electrical power distribution box 162. Electric energy storage device controller 139 may provide charge balancing between energy storage element (e.g., battery cells) and communication with other vehicle controllers (e.g., vehicle control unit 10). Power distribution module 139 controls flow of electrical power into and out of electric energy storage device 160.

The front axle 101 may be an integrated axle that includes a differential 106*a*, gearbox 107*a*, and propulsion source 105*a*. Alternatively, propulsion source 105*a* and gearbox 107*a* may be separate from front axle 101. Gearbox 107*a* includes a first speed sensor 119*a* for sensing an input shaft speed, a second speed sensor 120*a* for sensing a transmission output shaft speed, a clutch actuator 112*a*, a sprag clutch lock ring actuator 121*a*, sprag clutch 117*a*, and a plate clutch position sensor 113*a*. In examples where propulsion source 105*a* is an electric machine, electric power inverter 115*a* is electrically coupled to propulsion source 105*a*. A transmission control unit 116*a* is electrically coupled to sensors and actuators of gearbox 107*a*.

Propulsion source 105*a* may transfer mechanical power to or receive mechanical power from gearbox 107*a*. As such, gearbox 107*a* may be a two speed gearbox that may shift between gears when commanded via transmission control unit 116*a*. Gearbox 107*a* may transfer mechanical power to or receive mechanical power from differential 106*a*. Differential 106*a* may transfer mechanical power to or receive mechanical power from wheels 102 via right half shaft 101*a* and left half shaft 101*b*. Propulsion source 105*a* may consume alternating current (AC) electrical power provided via electrical inverter 115*a*. Alternatively, propulsion source 105*a* may provide AC electrical power to electrical inverter 115*a*. Electrical power inverter 115*a* may be provided with high voltage direct current (DC) power from electrical energy storage device 160 (e.g., a traction battery or a traction capacitor). Electric power inverter 115*a* may convert the DC electrical power from electrical energy storage device 160 into AC electrical power for propulsion source 105*a*. Alternatively, electrical power inverter 115*a* may be provided with AC power from propulsion source 105*a*. Electric power inverter 115*a* may convert the AC electrical power from propulsion source 105*a* into DC power to store in electrical power storage device 160.

Vehicle 10 includes a vehicle control unit (VCU) controller 152 (as also shown in FIG. 1A) that may communicate with inverter 115*a*, inverter 115*b*, transmission controller 116*a*, transmission controller 116*b*, friction or foundation brake controller 170, global positioning system (GPS) 188, and dashboard 130 and components included therein via controller area network (CAN) 120. VCU 152 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156 as shown in FIG. 1A. Sensors 154 may include but are not limited to lateral accelerometers, longitudinal accelerometers, yaw rate sensors, inclinometers, temperature sensors, electric energy storage device voltage and current sensors, and other sensors described herein. Additionally, sensors 154 may include steering angle sensor 199, accelerator pedal position sensor 141, vehicle range finding sensors including radio detection and ranging (RADAR), light detection and ranging (LIDAR), sound navigation and ranging (SONAR), and brake pedal position sensor 151. Actuators may include but are not limited to inverters, transmission controllers, display devices, human/machine interfaces, friction braking systems, and electric energy storage device controller described herein.

Accelerator pedal sensor 141 is shown coupled to accelerator pedal 140 for determining a degree of application of accelerator pedal 140 by human 142. Brake pedal sensor 151 is shown coupled to brake pedal 150 for determining a degree of application of brake pedal 150 by human 142. Steering angle sensor 199 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system may also include a dashboard 130 that an operator of the vehicle may interact with. Dashboard 130 may include an interactive weather data display and notification system 134 that may communicate weather forecast data to VCU 152. Weather data display and notification system 134 may receive weather data and forecasts at the vehicle's present location from communications satellite 179. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to initiate and/or terminate operation of the vehicle driveline (e.g., electric machine 105*a* and electric machine 105*b*) based on an operator input. Various examples of the operator interface 136 may include interfaces that require a physical apparatus, such as an active key, that may be inserted into the operator interface 136 to activate the electric machines 105*a* and 105*b* and to turn on the vehicle 10, or may be removed to shut down the electric machines 105*a* and 105*b* to turn off the vehicle. Other examples may include a passive key that is communicatively coupled to the operator interface 136. The passive key may be configured as an electronic key fob or a smart key that does not have to be inserted or removed from the interface 136 to operate the vehicle electric machines 105*a* and 105*b*. Rather, the passive key may need to be located inside or proximate to the vehicle (e.g., within a threshold distance of the vehicle). Still other examples may additionally or optionally use a start/stop button that is manually pressed by the operator to start or shut down the electric machines 105*a* and 105*b* to turn the vehicle on or off. In other examples, a remote electric machine start may be initiated remote computing device (not shown), for example a cellular telephone, or smartphone-based system where a user's cellular telephone sends data to a server and the server communicates with the vehicle controller 152 to activate an inverter and electric machine. Spatial orientation of vehicle 10 is indicated via axes 175.

Vehicle 10 is also shown with a foundation or friction brake controller 170. Brake controller 170 may selectively apply and release friction brakes 172 via allowing hydraulic fluid to flow to friction brakes 172. Front friction brakes 172*a* and rear friction brakes 172*b* may be applied and released so as to avoid locking of friction brakes 172*a* to wheels 102 and brakes 172*b* to wheels 103. Wheel position or speed sensors 161 may provide wheel speed data to brake controller 170.

Vehicle propulsion system 199 may provide torque to wheels 102 and 103 to propel vehicle 10. Vehicle propulsion system 199 may operate in a two wheel drive mode where propulsion source 105*a* or propulsion source 105*b* is activated and where the other of propulsion source 105*a* or propulsion source 105*b* is not activated. Alternatively, vehicle propulsion system may operate in a four wheel drive mode where both electric machines 105*a* and 105*b* are activated.

A human or autonomous driver may request a driver demand wheel torque, or alternatively a driver demand wheel power, via applying accelerator pedal 140 or via supplying a driver demand wheel torque/power request to vehicle controller 10. Vehicle controller 152 may then allocate a fraction of the driver demand wheel torque/power to be provided by propulsion source 105*a* and the remaining amount of driver demand wheel torque/power to be provided via propulsion source 105*b* when vehicle 10 is operating in a four wheel drive mode. Thus, vehicle controller 152 may determine a torque/power distribution between front axle 101 and rear axle 190. In one example, a baseline torque/power distribution may be 50:50 or 50% of the requested wheel torque/power is to be generated via the front axle 101 and 50% of the requested wheel torque/power is to be generated via the rear axle 190 when vehicle propulsion system 199 is being operated in a four wheel drive mode.

Once vehicle controller 152 determines the torque/power distribution between the front axle 101 and the rear axle 190, vehicle controller 152 may command inverter 115*a* to deliver the portion of the driver demand wheel torque/power allocated to front axle 101 and may command inverter 115*b* to deliver the portion of the driver demand wheel torque/power allocated to rear axle 190. Inverters 115*a* and 115*b* may convert DC electrical power from electrical energy storage device 160 into AC power and supply the AC power to propulsion source 105*a* and propulsion source 105*b*. Propulsion source 105*a* rotates and transfers torque/power to gearbox 107*a*. Gearbox 107*a* may supply torque from propulsion source 105*a* to differential 106*a*, and differential 106*a* transfers torque from propulsion source 105*a* to wheels 102 via half shafts 101*a* and 101*b*. Similarly, propulsion source 105*b* rotates and transfers torque/power to gearbox 107*b*. Gearbox 107*b* may supply torque/power from propulsion source 105*b* to differential 106*b*, and differential 106*b* transfers torque/power from propulsion source 105*b* to wheels 103 via half shafts 190*a* and 190*b*.

During conditions when the accelerator pedal is fully released, vehicle controller 152 may request a small negative or regenerative braking power to gradually slow vehicle 10 when a speed of vehicle 10 is greater than a threshold speed. This regenerative braking power may mimic engine braking of vehicles having an internal combustion engine during vehicle coasting conditions. Vehicle controller 152 may determine a regenerative braking power distribution between front axle 101 and rear axle 190. The amount of regenerative braking power requested may be a function of accelerator pedal position, electric energy storage device state of charge (SOC), vehicle speed, and other conditions. If the accelerator pedal is fully released and vehicle speed is less than a threshold speed, vehicle controller 152 may request a small amount of positive torque/power from propulsion source 105*a* and/or 105*b*, which may be referred to as creep torque or power. The creep torque or power may allow vehicle 10 to remain stationary when vehicle 10 is on a positive grade.

The human or autonomous driver may also request a negative or regenerative driver demand braking torque, or alternatively a driver demand braking power, via applying brake pedal 150 or via supplying a driver demand braking power request to vehicle controller 10. Vehicle controller 152 may then allocate a fraction of the driver demand braking power to be provided by propulsion source 105*a* and another amount of driver demand braking power to be provided via propulsion source 105*b* when vehicle 10 is operating in a four wheel drive mode. Additionally, vehicle controller 152 may request that a portion of the driver demanded braking power be provided via friction brakes 172*a* via commanding brake controller 170 to provide the requested portion of the driver requested braking power. In one example, a baseline braking power distribution may be 65:35 or 65% of the requested braking power is to be generated via the front axle 101 and 35% of the requested braking power is to be generated via the rear axle 190.

After vehicle controller 152 determines the braking power distribution between the front axle 101 and the rear axle 190, vehicle controller 152 may command inverter 115*a* and/or front friction brakes 172*a* to deliver the portion of the driver braking power allocated to front axle 101. Vehicle controller 152 may command inverter 115*b* and/or rear friction brakes 172*b* to deliver the portion of the driver demand braking power allocated to rear axle 190. Inverters 115*a* and 115*b* may convert AC electrical power generated by propulsion sources 105*a* and 105*b* converting the vehicle's kinetic energy into DC power for storage in electrical energy device 160.

Transmission control units 116*a* and 116*b* include predetermined transmission gear shift schedules whereby second gears of gearboxes 107*a* and 107*b* may be selectively engaged and disengaged. Shift schedules stored in transmission control units 116*a* and 116*b* may select gear shift points or conditions as a function of driver demand wheel torque and vehicle speed. Transmission control units 116*a* and 116*b* may selectively open and close wet or dry plate clutches 118*a* and 118*b* to engage and disengage second gear in the respective gearboxes via clutch actuators 112*a* and 112*b*.

Figure 1B:
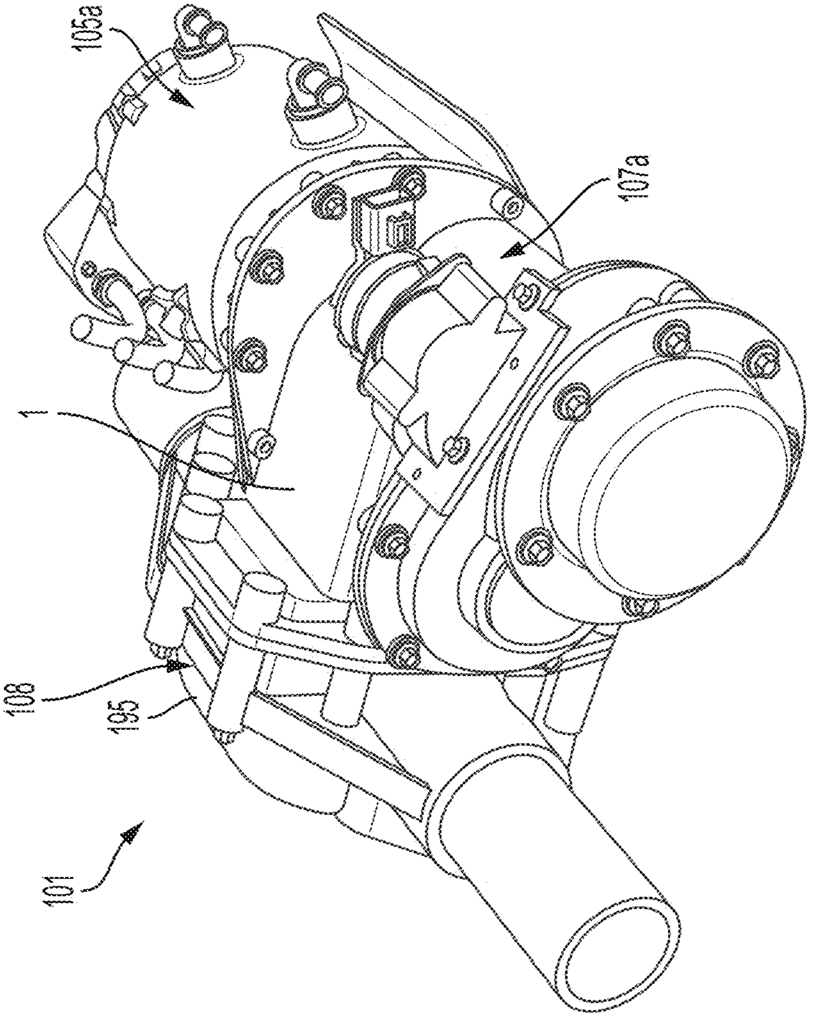
FIGS. 1B-1E show detailed axle views.
Figure 1C:
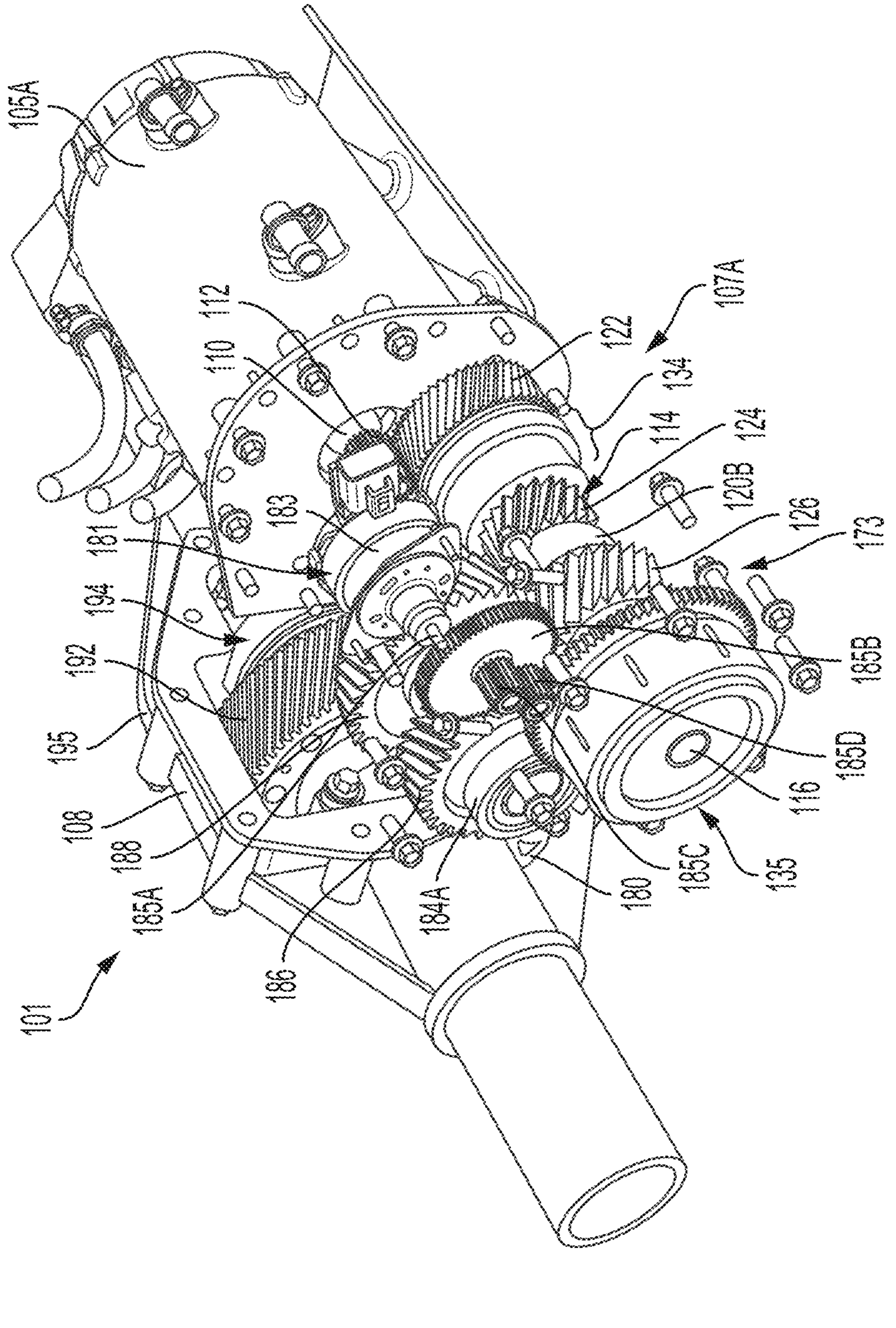
Figure 1D:
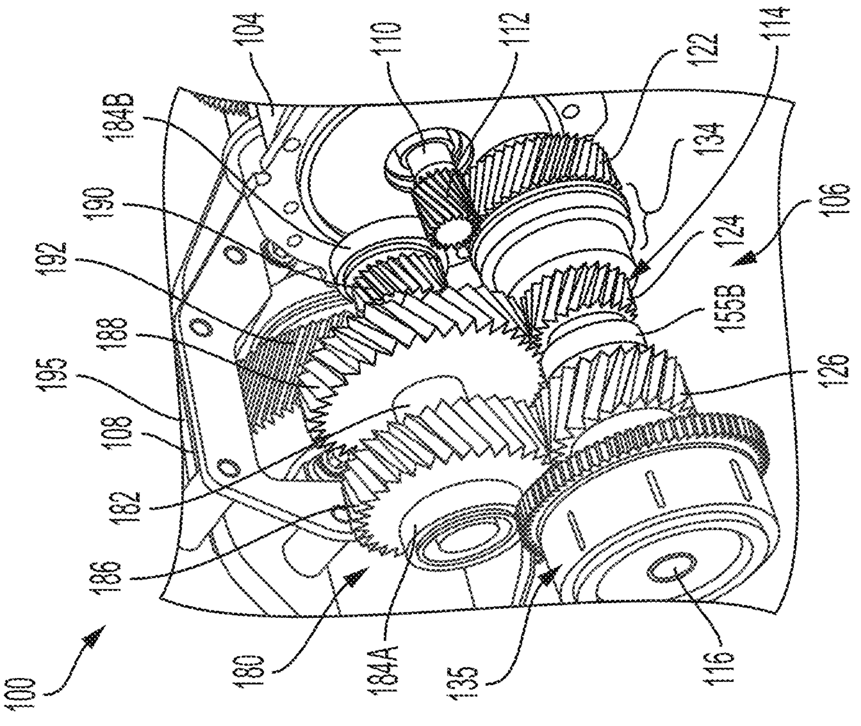

Referring now to FIG. 1B, an example electric drive axle 101 is shown. Rear axle 190 may be of similar construction. The electric drive axle 101 comprises an electric motor-generator 105*a*, a gearbox 107*a*, and an axle assembly 108. As illustrated in FIG. 1A, the electric motor-generator 105*a* may be coupled to the power source (not shown). In certain embodiments, the electric motor-generator 105*a* may be a permanent magnet synchronous machine comprising a stator disposed concentrically about a rotor. As more clearly shown in FIGS. 1C and 1D, the electric motor-generator 105*a* includes an output shaft 110. In a non-limiting example, the output shaft 110 is coupled to a rotor (not depicted) of the electric motor-generator 105*a* for rotation therewith. The output shaft 110 may be rotatably supported via at least one bearing (not depicted), if desired. A first gear 112 may be coupled to the output shaft 110 for rotation therewith. Accordingly, the electric motor-generator 105*a* drives the first gear 112 when the electric motor-generator 105*a* is in operation. The first gear 112 may be disposed axially adjacent to the at least one bearing, if desired. In one embodiment, the first gear 112 may be forged on the output shaft 110. In another embodiment, the first gear 112 may be welded to the output shaft 110. In another embodiment, the first gear 112 may be splined to the output shaft 110. Additional or alternate methods for coupling the first gear 112 to the output shaft 110 may be employed, as desired.

In certain embodiments, the electric motor-generator 105*a* is in driving engagement with a first gear assembly 114 of the gearbox 107*a* via the output shaft 110 and the first gear 112. The first gear assembly 114 is disposed parallel to the output shaft 110 of the electric motor-generator 105*a*. In certain embodiments, the first gear assembly 114 includes a rotatable shaft 116, which may be supported in a housing 118 of the gearbox 107*a* by bearings 155A, 155B. It is understood that various types of bearings 155A, 155B may be employed such as roller bearings, ball bearings, tapered bearings, and the like, for example. As described herein, bearings may include roller elements, races, etc. Additionally, a greater or lesser number of bearings may support the rotatable shaft 116, in other embodiments.

The first gear assembly 114 includes a second gear 122 in driving engagement with the first gear 112. The second gear 122 is coupled for rotation with the rotatable shaft 116 between the bearings 155A, 155B. As illustrated, the first gear assembly 114 further includes a third gear 124 and a fourth gear 126. In certain embodiments, such as the embodiment depicted in FIG. 1E, the third gear 124 includes an annular sleeve portion 152 and is concentrically disposed about the rotatable shaft 116 and may freely rotate relative thereto via at least one bearing 128 (e.g., a needle bearing) disposed radially there between. Likewise, the fourth gear 126 includes an annular sleeve portion 166 and is concentrically disposed about the rotatable shaft 116 and may freely rotate relative thereto via at least one bearing 130 (e.g., a ball bearing) disposed radially there between. As described herein, a radial direction is any direction extending outward from and perpendicular to an axial direction (e.g., an axis of rotation).

At least one spacer (not depicted) and/or at least one positioning element (not depicted) may be employed to militate against an axial movement of the bearings 128, 130 along the rotatable shaft 116. It is understood that the positioning element can be any type of positioning element as desired such as a snap ring, for example. A thrust bearing 132 may be disposed concentrically about the rotatable shaft 116 and interposed between the third gear 124 and the bearing 120B. The thrust bearing 132 is configured to militate against friction between the third gear 124 and the bearing 120B. It should be appreciated that additional thrust bearings may be employed to militate against friction between other components of the gearbox 107*a*, if desired. Various types of thrust bearings can be employed as desired.

In certain embodiments, the electric motor-generator 105*a* drives the third gear 124 of the first gear assembly 114 when a first clutch assembly 134 is engaged, or drives the fourth gear 126 when the second clutch assembly 135 is engaged. It should be appreciated that any type of clutch or clutch assembly can be employed as desired for each of the first clutch assembly 134 and the second clutch assembly 135 such as a brake, a one-way brake, a friction brake, a wet clutch or assembly, a simple dog clutch or assembly, a dog clutch or assembly with a synchronizer, and the like, for example. In certain embodiments, only one of the clutch assemblies 134, 135 is engaged at any one time.

In the illustrated embodiment, the first clutch assembly 134 is disposed between the second and third gears 122, 124. It is understood that the first clutch assembly 134 may be disposed at other positions on the first gear assembly 114, if desired. As a non-limiting example, the first clutch assembly 134 may include a one-way clutch 136 (e.g., a sprag clutch) having the locking device 138. The clutch 136 is concentrically disposed about the rotatable shaft 116. As illustrated, the clutch 136 is drivingly connected to the third gear 124. In certain embodiments, the clutch 136 includes an outer first ring 140 having a first portion 146 extending axially along a longitudinal axis of the rotatable shaft 116, and a second portion 148 extending radially inward towards the rotatable shaft 116. An end 150 of the second portion 148 is fixedly coupled to an annular sleeve portion 152 of the third gear 124 such that the third gear 124 rotates with the first ring 140 of the clutch 136. It is understood, however, that the clutch 136 may be coupled to the third gear 124 by a variety of suitable methods, as desired.

The clutch 136 further includes a plurality of movable elements 142 (e.g., sprags) interposed between the first ring 140 and an outer peripheral surface 144 of the rotatable shaft 116. The movable elements 142 are disposed at specific angles to transfer torque. In another embodiment, the clutch 136 may further include an inner second ring (not depicted) disposed radially between the movable elements 142 and the rotatable shaft 116. In both embodiments, the movable elements 142 are configured to frictionally engage (e.g., bind) and maintain a substantially stationary position within the first ring 140 when the rotatable shaft 116 is rotated in a first direction. Accordingly, the clutch 136 is engaged and torque is transferred from the rotatable shaft 116 to the third gear 124. In contrast, the movable elements 142 are configured to freely rotate within the first ring 140 when the first ring 140 is rotated in an opposite second direction. As such, the clutch 136 remains disengaged.

Figure 1E:
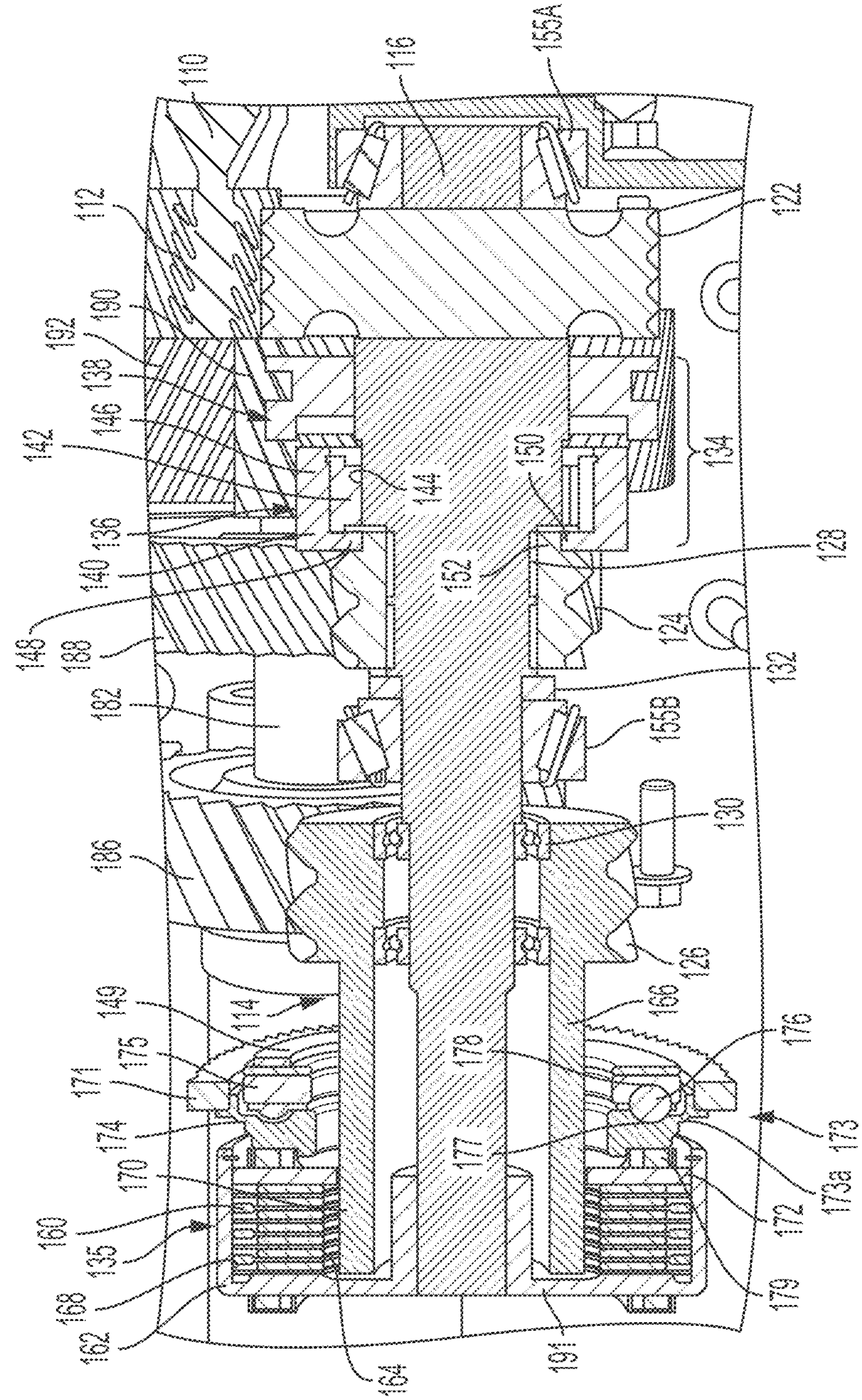

As more clearly illustrated in FIG. 1E, the locking device 138 is concentrically disposed about and movably coupled to the rotatable shaft 116. In certain embodiments, the locking device 138 is coupled to the rotatable shaft 116 by a splined engagement. More particularly, the locking device 138 has a plurality of splines (not depicted) formed on an inner peripheral surface thereof configured to mate with a plurality of splines (not depicted) formed on an outer peripheral surface of the rotatable shaft 116. It is understood, however, that the locking device 138 may be movably coupled to the rotatable shaft 116 by a variety of suitable methods, as desired.

In one embodiment, the locking device 138 is configured to axially translate between a first or disengaged position, shown in FIG. 1E, and a second or engaged position (not depicted). In the first position, the locking device 138 is spaced apart from the clutch 136 and rotates only with the rotatable shaft 115 when it is rotated in the first direction. In contrast, the locking device 138, in the second position, engages the first ring 140 of the clutch 136 so that the locking device 138 is removably coupled to the clutch 136 for rotation therewith when the third gear 124 and clutch 136 are rotated in the second direction during a power regeneration mode or when the vehicle 10 is operating in reverse. An actuator mechanism (not depicted) for the locking device 138 may include an actuator (e.g., a shift fork), an additional gear set, and/or a roller and ramp assembly. The actuator may include a brushless direct current motor and/or reversible electric motor as it is compact and easily controllable. It is understood that any other appropriate type of actuator and actuator mechanism for the locking device 138 may be used such as hydraulic or pneumatic actuators, for example.

In the depicted embodiment, the second clutch assembly 135 is disposed about an end of the rotatable shaft 116 opposite the electric motor-generator **105*a* and adjacent the fourth gear 126. It is understood that the second clutch assembly 135 may be disposed at other positions on the first gear assembly 114, if desired. As a non-limiting example, the second clutch assembly 135 may include a plurality of first clutch plates 160 extending radially inward from a clutch hub 162. A plurality of second clutch plates 164 extend radially outward from the sleeve portion 166 of the fourth gear 126. The first clutch plates 160 interleave with the second clutch plates 164. It should be appreciated that different numbers of first and second clutch plates 160, 164 may be employed, as desired. Each of the clutch plates 160, 164 is concentrically disposed about the sleeve portion 166 of the fourth gear 126 and within an annular recess 168 of the clutch hub 162** for axial movement therein.

In certain embodiments, each of the first clutch plates 160 includes a plurality of splines (not depicted) extending radially outward therefrom. The splines of the first clutch plates 160 mate with a plurality of splines formed on an inner surface of the clutch hub 162. As such, the first clutch plates 160 receive torque from the electric motor-generator **105*a* via the rotatable shaft 116 and the clutch hub 162. The first clutch plates 160 may move axially relative to the clutch hub 162 within the second clutch assembly 135. The first clutch plates 160 transfer the torque from the rotatable shaft 116 and the clutch hub 162 to the second clutch plates 164. It is understood that the first clutch plates 160 can be coupled to the clutch hub 162**, while permitting an axial movement thereof, by a variety of suitable methods, as desired.

In the same embodiment, the second clutch plates 164 are in meshed engagement with the sleeve portion 166 of the fourth gear 126. In certain embodiments, each of the second clutch plates 164 includes a plurality of splines (not depicted) extending radially inward therefrom. The splines of the second clutch plates 164 mate with the splines formed on an outer peripheral surface 170 of the sleeve portion 166 of the fourth gear 126. As such, the second clutch plates 164 receive the torque from the first clutch plates 160. The second clutch plates 164 may move axially relative to the clutch hub 162 within the second clutch assembly 135. The second clutch plates 164 transfer the torque from the first clutch plates 160 to the sleeve portion 166, and thereby the fourth gear 126. Accordingly, the electric motor-generator **105*a* drives the fourth gear 126 when the second clutch assembly 135 is engaged. It is understood that the second clutch plates 164 can be coupled to the fourth gear 126**, while permitting an axial movement thereof, by a variety of suitable methods, as desired.

As more clearly illustrated FIG. 1E, a pressure plate 172 may be disposed at an open end of the clutch hub 162. The pressure plate 172 is generally ring-shaped and concentrically disposed about the sleeve portion 166 of the fourth gear 126. The pressure plate 172 may include a plurality of outer splines (not depicted) extending radially outward therefrom. The outer splines of the pressure plate 172 are configured to mate with the splines formed on the inner surface of the clutch hub 162. The pressure plate 172 may include a plurality of inner splines (not depicted) extending radially inward therefrom. The inner splines of the pressure plate 172 are configured to mate with the splines formed on the outer peripheral surface 170 of the sleeve portion 166 of the fourth gear 126.

The pressure plate 172 may move axially relative to the clutch hub 162 within the second clutch assembly 135. The pressure plate 172 is configured to urge the clutch plates 160, 164 in a first axial direction towards a substantially closed end 191 of the clutch hub 162 during engagement of the second clutch assembly 135. It is understood that the pressure plate 172 can be coupled to the clutch hub 162, while permitting an axial movement thereof, by a variety of suitable methods, as desired. In the embodiment illustrated in FIG. 1E, the pressure plate 172 is part of an actuator mechanism 173 for the second clutch assembly 135. As a non-limiting example, the actuator mechanism 173 for the second clutch assembly 135 is a ball ramp actuator assembly 173*a*.

The ball ramp actuator assembly 173*a* includes a control ring 171, a movable first plate 174, and a stationary second plate 175. The ball ramp actuator assembly allows for a space efficient actuation mechanism arrangement when compared to other types of actuators such as shift forks, for example. Consequently, the electric drive axle may be more compact to improve axle integration into the vehicle. In one embodiment, a positioning element 169 may be employed to maintain a stationary position of the second plate 175. It is understood, however, that a variety of suitable methods of maintaining the stationary position of the second plate 175 may be employed, if desired. A plurality of movable members 176 (e.g., balls) are disposed between the plates 174, 175. Relative rotation between the plates 174, 175 causes the movable members 176 to move along grooves 177, 178. The groove 177 formed in a face of the first plate 174 opposes the corresponding groove 178 formed in a face of the second plate 175. A thrust element 179 may be disposed between the first plate 174 and the pressure plate 172 to militate against friction there between. It should be appreciated that additional thrust bearings may be employed to militate against friction between other components of the ball ramp actuator assembly 173*a*, if desired. Various types of thrust elements and bearings can be employed as desired.

The control ring 171 is configured to rotate and translate axially toward and away from the pressure plate 172. As shown, the control ring 171 is coupled to the first plate 174. Thus, relative rotation of the control ring 171 causes rotation of the plate 174. The rotation of the plate 174 causes the movable members 176 to traverse the grooves 177 and 178. This causes the control ring 171 and the first plate 174 to axially move relative to the second plate 175. As such, the control ring 171, when rotated in a first direction, causes the first plate 174 to rotate in the first direction, thereby expanding (e.g., axially expanding) the ball ramp actuator assembly 173*a* and axially displacing the pressure plate 172 towards the clutch hub 162 which urges the clutch plates 160, 164 together and the second clutch assembly 135 to engage. In contrast, rotation of the control ring 171 in a second direction, causes the first plate 174 to rotate in the second direction, thereby contracting (e.g., axially contracting) the ball ramp actuator assembly 173*a* and axially displacing the pressure plate 172 away from the clutch hub 162 which permits the clutch plates 160, 164 to separate and the second clutch assembly 135 to disengage.

In the embodiment shown in FIG. 1C, the control ring 171 is drivingly connected to the actuator 181. The actuator 181 includes an electric motor 183 and a plurality of gears 185 (e.g., pinion gears 185*a*, 185*b*, 185*c*, and 185*d*). In this way, the actuator 181 may be adjusted via an electromagnetic component. The size and/or style of electric motor 183 may be selected based on the gearbox's end-use design parameters, for example. Additionally, in other embodiments, the plurality of gears may include fewer than four gears, or more than four gears. The actuator mechanism 173 for the second clutch assembly 135 may include an additional gear set (not depicted) and a roller and ramp assembly (not depicted). The actuator 181 may include a reversible electric motor-generator as it is compact and easily controllable. It is understood that other appropriate types of actuator 181 and actuator mechanism 173 for the second clutch assembly 135 may be used such as hydraulic or pneumatic actuators, for example. Further, the clutch assemblies 134, 135 may be positioned adjacent to each other such that a single actuator mechanism (not depicted) can separately actuate each of the clutch assemblies 134, 135. Providing two clutch assemblies in the gearbox enables the number of selectable gears in the drivetrain to be increased. As a result, the gearbox may be efficiently operated in a wider variety of driving scenarios, such as off-roading scenarios, towing scenarios, etc.

In certain embodiments shown in FIGS. 1C-1E, the electric motor-generator 105*a* drives a second gear assembly 180 via the third gear 124 when the first clutch assembly 134 is engaged, or via the fourth gear 126 when the second clutch assembly 135 is engaged. The second gear assembly 180 is disposed parallel to the output shaft 110 of the electric motor-generator 105*a* and the first gear assembly 114. As more clearly shown in FIG. 11, the second gear assembly 180 includes a rotatable shaft 182 rotatably supported in the gearbox 106 via bearings 184A, 184B. It is understood that each of the bearings 184A, 184B may be roller bearings, ball bearings, tapered bearings, and the like, for example.

A fifth, sixth, and seventh gears 186, 188, 190, respectively, are coupled for rotation with the rotatable shaft 182. The fifth gear 186 is disposed axially adjacent to the bearing 184A. The fifth gear 186 is in meshed engagement with the fourth gear 126 and receives torque therefrom when the second clutch assembly 135 is engaged and the electric motor-generator 105*a* drives the electric drive axle 101. The sixth gear 188 is disposed between the fifth and seventh gears 186, 190, respectively. The sixth gear 188 is in meshed engagement with the third gear 124 and receives torque therefrom when the first clutch assembly 134 is engaged and the electric motor-generator 105*a* drives the electric drive axle 101. The seventh gear 190 is disposed axially adjacent the bearing 184B. A pair of positioning elements (not depicted) may be respectively disposed on ends of the rotatable shaft 182 to maintain a position of the bearings 184A, 184B and the fifth, sixth, and seventh gears 186, 188, 190. It is understood that each of the positioning elements can be any type of positioning element as desired such as a snap ring, for example but could use a shim and press fit bearings if the application allows for it.

The seventh gear 190 receives torque from the rotatable shaft 182, when one of the first and second clutch assemblies 134, 135, respectively, is engaged and the electric motor-generator 105*a* drives the electric drive axle 101. As illustrated, the seventh gear 190 is in meshed engagement with an eighth gear 192. The seventh gear 190 drives the eighth gear 192, when one of the first and second clutch assemblies 134, 135, respectively, is engaged and the electric motor-generator 105*a* drives the electric drive axle 101. The eighth gear 192 is coupled for rotation with a differential 194. The differential 194 is rotatably supported within an axle housing 195 via a pair of bearings (not depicted). It is understood that each of the bearings may be roller bearings, ball bearings, tapered bearings, and the like, for example.

The system of FIGS. 1A-1E provides for a vehicle system, comprising: an electric machine coupled to an axle; a gearbox including a sprag clutch, a plate clutch, and a clutch actuator; and a controller including executable instructions stored in non-transitory memory that cause the controller to rotate the electric machine in a reverse direction in response to a request to characterize a relationship between a position of a clutch actuator and a torque capacity of the plate clutch. The system further comprises additional instructions to engage a parking pawl in response to the request to characterize the relationship between the position of the clutch actuator and the torque capacity of the plate clutch. The system further comprises additional instructions to disengage a locking ring of the sprag clutch in response to the request to characterize the relationship between the position of the clutch actuator and the torque capacity of the plate clutch. The system further comprises additional instructions to adjust a position of the clutch actuator at a predetermined rate. The system further comprises additional instructions to store to memory a position of the clutch actuator at which torque output of the electric machine increases. The system further comprises additional instructions to operate the electric machine in a speed control mode in response to the request to characterize the relationship between the position of the clutch actuator and the torque capacity of the plate clutch. The system further comprises additional instructions to adjust the relationship between the position of the clutch actuator and the torque capacity of the plate clutch, where the torque capacity of the plate clutch is determined from an amount of electrical current consumed via the electric machine.

Turning now to FIG. 2, a prophetic plot of an example relationship between a clutch actuator position and torque transfer capacity of a clutch is shown. The vertical axis represents clutch torque capacity (e.g., an amount of torque the clutch may transfer when a given force is applied to close the clutch). The clutch torque capacity increases in the direction of the vertical axis arrow. The horizontal axis represents a position of a clutch actuator. In some examples, the clutch actuator is a rotary actuator and the horizontal axis represents the distance of rotation of the rotary actuator. The clutch actuator position increases or is further applied in the direction of the horizontal axis. The clutch actuator is fully open and not applied when the clutch actuator position is at the position of the vertical axis. The clutch may be the second clutch assembly 135 shown in FIG. 1C, which selectively engages and disengages second gear.

Line 202 represents the relationship between clutch actuator position and clutch torque capacity, or clutch transfer function. The vertical line at P1 indicates a shortest distance through which the clutch actuator moves from a fully open position before torque is transferred via the clutch. This position may be referred to as the "kiss" position, or alternatively, as the "touch position." It may be desirable to determine this position so that the clutch actuator may be positioned near the "kiss" position just prior to actuating the clutch so that the amount of time to actuate the clutch may be reduced. In this example, the clutch torque capacity increases as the clutch actuator is applied further after the clutch begins to transfer torque after reaching the P1 position. Thus, for a given clutch actuator position, a clutch torque capacity may be determined. The relationship shown by line 202 may be used during gear shifting to estimate the amount of torque that is being transferred during a shift and to determine when the clutch begins to transfer torque.

Referring now to FIG. 3, a prophetic powertrain operating sequence according to the method of FIGS. 4 and 5 is shown. The operating sequence shown in FIG. 3 may be provided via the method of FIGS. 4 and 5 in cooperation with the system shown in FIG. 1A-1E. The plots shown in FIG. 3 occur at the same time and are aligned in time. The vertical lines at t0-t9 represent times of interest during the sequence. The SS marks along the horizontal axes represent breaks in time that may be long or short in duration.

The first plot from the top of FIG. 3 is a plot of a clutch characterization state versus time. The vertical axis represents the clutch characterization state and the plate clutch (e.g., clutch assembly 135 shown in FIG. 1C) is being characterized when trace 302 is at a higher level near the vertical axis arrow. Trace 302 represents the clutch characterization state.

The second plot from the top of FIG. 3 is a plot of an electric machine operating mode versus time. The vertical axis represents the electric machine operating state and the electric machine operating states are located along the vertical axis. Specifically, the electric machine modes include a speed control mode, a torque control mode where positive torque is delivered via the electric machine (e.g., 105*b* of FIG. 1A), and a regeneration mode where the electric machine converts power from an axle into electric charge that is stored in an electric energy storage device. The horizontal axis represents time and time increases from the left side of the figure to the right side of the figure. Trace 304 represents the electric machine operating mode.

The third plot from the top of FIG. 3 is a plot of clutch actuator position versus time. The vertical axis represents the clutch actuator position and the clutch actuator position increases or is moved closer to a closed state in the direction of the vertical axis arrow. FC indicates a fully closed plate clutch position and FO represents a fully open plate clutch position. The horizontal axis represents time and time increases from the left side of the figure to the right side of the figure. Trace 306 represents the clutch actuator position.

The fourth plot from the top of FIG. 3 is a plot of electric machine torque versus time. The electric machine torque may be estimated from the electric machine that is consumed via the electric machine. The vertical axis represents electric machine torque and electric machine torque increases in the direction of the vertical axis arrow. The electric machine torque is zero near the horizontal axis, and electric machine torque is negative below the horizontal axis. The horizontal axis represents time and time increases from the left side of the figure to the right side of the figure. Trace 308 represents the electric machine torque.

The fifth plot from the top of FIG. 3 is a plot of the rotational direction of the electric machine versus time. The direction of electric machine rotation is indicated along the vertical axis. The electric machine is rotating in a direction that causes the vehicle to move in a forward direction when trace 310 is at the level indicated as FWD. The electric machine is stopped and not rotating when trace 310 is at the level of STOP. The electric machine is rotating in a direction that is opposite of forward or in reverse when trace 310 is at the level REV. The horizontal axis represents time and time increases from the left side of the figure to the right side of the figure. Trace 310 represents the direction of rotation for the electric machine (e.g., 105*b* of FIG. 1A).

The sixth plot from the top of FIG. 3 is a plot of electric machine speed versus time. The vertical axis represents electric machine speed and electric machine speed increases in the direction of the vertical axis arrow. The horizontal axis represents time and time increases from the left side of the figure to the right side of the figure. Trace 312 represents the electric machine speed.

At time t0, the electric machine speed is zero and the electric machine is in a torque control mode. The plate clutch is not being characterized and the electric machine torque is zero. The clutch actuator is in a fully open position so that the plate clutch does not transmit torque from the electric machine to the axle.

At time t1, clutch characterization is requested (not shown) and the clutch characterization process begins. The electric machine changes to a speed control mode and electric machine torque is increased to accelerate the electric machine to the requested speed. The plate clutch remains fully open and the electric machine is rotated in a reverse direction while the sprag clutch locking ring is disengaged (not shown). The parking pawl (not shown) may also be engaged to prevent rotation of the transmission output shaft (e.g., 182 shown in FIG. 1D). By rotating the electric machine in the reverse direction with the sprag clutch locking ring disengaged, the sprag clutch does not transfer torque from the transmission input shaft (e.g., 116 of FIG. 1D) to the transmission output shaft (e.g., 182 shown in FIG. 1D). Consequently, when the plate clutch begins to close, electric machine torque that is transferred to the transmission output shaft via the plate clutch may be decoupled from the sprag clutch. Torque of the electric machine begins to be recorded to RAM.

At time t2, the clutch actuator position is adjusted at a predetermined rate to begin closing the plate clutch. However, the electric machine torque does not change since the plate clutch does not initially transfer torque. The electric machine continues to rotate in a reverse direction at its commanded speed. The electric machine continues to operate in a speed control mode and the sprag clutch locking ring (not shown) remains disengaged.

At time t3, an amount of torque that is delivered to the electric machine is increased to compensate for the beginning of torque transfer from the electric machine to the transmission output shaft. However, the transmission output shaft (not shown) does not rotate since the parking pawl is engaged. The clutch actuator position at which electric machine torque increases is stored to controller RAM. This is the clutch actuator position at which the plate clutch begins to transfer torque (e.g., the "kiss" position). The electric machine speed is controlled to its commanded speed via adjusting torque output of the electric machine and the electric machine remains in speed control mode. The electric machine continues to rotate in a reverse direction.

Between time t3 and time t4, the clutch actuator position is adjusted to close the plate clutch such that the torque capacity of the plate clutch increases. The electric machine torque is recorded to RAM at this time and the torque capacity of the plate clutch is the electric machine torques that are recorded between times t3 and t4 minus the electric machine torque that was recorded just prior to time t2. The clutch actuator is moved toward a fully closed position until a predetermined torque output of the electric machine is reached. The predetermined torque output of the electric machine may be based on a torque capacity of the parking pawl. The clutch actuator is moved toward a fully open position after torque output of the electric machine reaches the predetermined level. The electric machine continues to rotate in a reverse direction and it continues to operate in a speed control mode. The plate clutch continues to be characterized.

At time t4, torque output of the electric machine ceases decreasing and the clutch actuator position is stored to RAM. This clutch actuator position may be determined to be the clutch release position or where the plate clutch is no longer transferring torque from the transmission input shaft (e.g., 116 of FIG. 1D) to the transmission output shaft (e.g., 182 shown in FIG. 1D). The electric machine continues to rotate in a reverse direction and it continues to operate in a speed control mode.

At time t4, the plate clutch characterization procedure ceases and the electric machine reverts to a torque mode. The electric machine torque is commanded to zero and the electric machine speed begins decreasing. The clutch actuator is in a fully open position and the electric machine torque is reduce to zero.

In this way, torque capacity of a plate clutch and a relationship between clutch actuator position and plate clutch torque capacity may be determined when a vehicle is stationary and not moving. It may be desirable to preform such a procedure when a vehicle is coupled to an electric grid so that driveline operation may not be interrupted. Further, such a procedure may increase accuracy of determining the relationship between clutch actuator position and plate clutch torque capacity since the transmission output shaft may be locked and not rotating, thereby improving the plate clutch torque capacity estimation. The sequence breaks between time t25 and time t26.

Just before time t6, the electric machine is rotating and the vehicle (not shown) is traveling on a road. Clutch characterization is not being performed and the electric machine is providing positive torque to the driveline while the clutch actuator has the plate clutch fully closed (e.g., second gear is engaged). The electric machine torque is at a positive lower value and the electric machine is rotating in a forward direction. The electric machine torque amount is based on accelerator pedal position (not shown). The sprag clutch locking ring (not shown) is disengaged so that the sprag clutch may be overrun.

At time t6, the accelerator pedal is fully released and clutch characterization begins. The electric machine is switched from motoring to regeneration and the electric machine torque is adjusted to a small negative torque amount (e.g., the smallest negative consistent torque that may be provided by the electric machine). The electric machine continues to rotate in the forward direction and the electric machine speed is unchanged. Electric machine torque and clutch actuator position are stored to RAM.

Between time t6 and time t7, the electric machine speed declines a small amount as vehicle speed (not shown) declines due to the electric machine being in the regeneration mode and absorbing torque from the driveline. The clutch actuator is moved toward the open position, but the plate clutch remains closed and not slipping. The electric machine continues to provide a small negative torque to the driveline and the electric machine continues to rotate in a forward direction. Electric machine torque and clutch actuator position continue to be stored to RAM.

At time t7, the clutch actuator has opened to a position where the plate clutch begins to slip. Consequently, the electric machine is reduced since torque that is transferred from the vehicle's wheels to the electric machine is reduced. The electric machine continues to rotate in a forward direction and the electric machine continues in the regeneration mode where it applies a negative torque to the driveline. Electric machine torque and clutch actuator position continue to be stored to RAM.

At time t8, the clutch actuator is adjusted to a position where the plate clutch is fully open so that torque is not transferred from the vehicle's wheels to the electric machine. As a result, the electric machine speed is reduced to zero by the negative torque that is produced by the electric machine. The torque of the electric machine is reduced to zero when the electric machine is near zero speed. The clutch actuator position where electric machine torque is reduced to zero may be the estimated position where the clutch actuator fully opens the plate clutch (e.g., the clutch "kiss" position for opening the plate clutch). Alternatively, the estimated position where the clutch actuator fully opens the plate clutch may be a position at which a difference between a speed of the transmission input shaft and a speed of the transmission output shaft changes. Electric machine torque and clutch actuator position continue to be stored to RAM. The clutch characterization is still in progress and the vehicle continues to travel down the road (not shown). The sprag clutch locking ring (not shown) remains disengaged.

At time t9, the clutch characterization ends. The plate clutch may be closed or the locking ring may be engaged depending of the vehicle speed (not shown). The electric machine is shown in regeneration mode, but it may transition back to providing a positive torque if the driver demand torque (not shown) is increased. The electric machine continues to rotate in a forward direction.

In this way, it may be possible to determine a clutch actuator position where a plate clutch fully opens. The procedure may be performed during vehicle deceleration while the electric machine is in a regeneration mode supplying a requested negative torque to the vehicle driveline.

Referring now to FIGS. 4 and 5, a method for characterizing a relationship between a clutch actuator and a torque capacity of a plate clutch is shown. The method of FIGS. 4 and 5 may be incorporated into and may cooperate with the system of FIGS. 1A-1E. Further, at least portions of the method of FIGS. 4 and 5 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include, but are not limited to vehicle speed, electric energy storage device SOC, accelerator pedal position, brake pedal position, electric machine operating mode, electric machine torque, and clutch actuator position. Method 400 may determine the vehicle operating conditions based on output of the various sensors and actuators described herein as well as states of variables within one or more vehicle controllers. Method 400 proceeds to 404 after determining vehicle operating conditions.

At 404, method 400 judges whether or not plate clutch characterization is desired or requested. Plate clutch characterization may be desired or requested after a vehicle has travelled a predetermined distance, during end of line testing at a manufacturing facility, after a predetermined total number of transmission gear shifts, at predetermined time intervals, and in response to driveline torque disturbances. If method 400 judges that plate clutch characterization is desired or requested, the answer is yes and method 400 proceeds to 406. Otherwise, the answer is no and method 400 proceeds to 430.

At 430, method 400 applies and releases the plate clutch (e.g., second clutch assembly 135 shown in FIG. 1C) according to a plate clutch characterization that is stored in controller memory (e.g., the characterization shown in FIG. 2). For example, just before a power-on upshift, the clutch actuator position may be adjusted to a position at or immediately before where the plate clutch begins to transfer torque (e.g., where the plate clutch torque capacity increases from zero to a positive value). During the gear shift, the plate clutch may be commanded to a particular torque capacity to ensure a smooth shift without fully locking the plate clutch. The clutch actuator may be commanded to a position that provides the torque capacity, and the positon of the clutch actuator may be determined via the clutch characterization between plate clutch torque capacity and clutch actuator position. Similarly, the clutch actuator may be adjusted to provide a requested clutch torque capacity during a downshift. Method 400 proceeds to exit after the plate clutch is controlled according to the plate clutch characterization.

At 406, method judge whether or not the clutch characterization is to be performed during static vehicle conditions (e.g., when the vehicle is stopped). Method 400 may judge that the clutch characterization is to be performed at static vehicle conditions if it is desirable to determine clutch torque capacity above torque capacity of the clutch where the clutch begins to close. Further, method 400 may judge that the clutch characterization is to be performed at static vehicle conditions if the vehicle is electrically coupled to a stationary power grid. In addition, method 400 may judge that the clutch characterization is to be performed at static vehicle conditions if diagnostics are being performed on the vehicle and other selected vehicle conditions. If method 400 judges that plate clutch characterization is to be performed during static vehicle conditions, the answer is yes and method 400 proceeds to 440. Otherwise, the answer is no and method 400 proceeds to 408. Method 400 may require that the vehicle 10 is stationary before proceeding to 440.

At 440, method 400 may command the electric machine (e.g., 105*b*) to cease rotating to ensure known a known vehicle state at the beginning of plate clutch characterization. Method 400 proceeds to 442.

At 442, method 400 engages a parking pawl or other transmission shaft locking device, if present, so that the output shaft of the transmission is prevented from moving. By preventing the output shaft from moving, the operating state of the output shaft may be determined. Method 400 proceeds to 444.

At 444, method 400 commands the plate clutch to a fully open position. The plate clutch is commanded fully open via the clutch actuator. By fully opening the plate clutch, it may be known that the plate clutch is not initially transferring torque (e.g., its clutch capacity is zero). Method 400 proceeds to 446.

At 446, method 400 moves the sprag clutch locking ring to a disengaged or unlocked position that allows an input side of the sprag clutch to rotate in one direction without transferring, or transferring very little, torque across the sprag clutch. Method 400 proceeds to 448.

At 448, method 400 begins rotating the electric machine (e.g., 105*b*) in a reverse direction (e.g., counter clockwise). Because the output shaft is locked via the parking pawl, and because the sprag clutch locking ring is disengaged, the sprag clutch is overrun which allows the transmission input shaft (e.g., 116 of FIG. 1D) to rotate without transferring torque to the transmission output shaft (e.g., 182 shown in FIG. 1D). The electric machine is operated in a speed control mode and it is commanded to a constant predetermined speed. Method 400 proceeds to 450.

At 450, method 400 monitors an amount of electrical current that is supplied to rotate the electric machine at the constant speed. The amount of electric current that rotates the electric machine at the requested constant speed is stored to RAM. Method 400 proceeds to 452.

At 452, method 400 begins to adjust the clutch actuator from a position where the plate clutch is fully open to a position where the plate clutch is partially closed. The clutch actuator position is adjusted at a predetermined rate (e.g., 20 degrees of rotation/second). The clutch actuator position and electric machine torque are stored to RAM at a predetermined rate (e.g., sampled every 2 milliseconds). Method 400 proceeds to 454.

At 454, method 400 judges whether or not an amount of electric current that is consumed by the electric machine has increased by a predetermined amount. Since the electric machine is operating in speed control mode and because the sprag clutch is being overrun, torque from the electric machine may increase if torque is transferred from the electric machine to the transmission output shaft, which is prevented from moving via the engaged parking pawl or other device. The torque of the electric machine may be increased to maintain the speed of the electric machine to compensate torque that is transferred via the plate clutch. However, as long as the plate clutch does not transfer torque and the electric machine speed is constant, the electric machine torque is not expected to change by more than a threshold amount. Therefore, an increase in electric machine torque may be indicative of the plate clutch transferring torque and the clutch actuator being in a position where the plate clutch begins to transfer torque. If method 400 judges that electric machine torque has increased by more than a predetermined amount, the answer is yes and method 400 proceeds to 456. Otherwise, the answer is no and method 400 returns to 452.

Alternatively, method 400 may determine if speed of the electric machine is reduced temporarily by a predetermined speed. If so, the answer is yes and method 400 proceeds to 456. Otherwise, the answer is no and method 400 returns to 452.

At 456, method 400 stores the present position of the clutch actuator into controller RAM. Method 400 proceeds to 458.

At 458, method 400 continues to apply the clutch actuator at the predetermined rate and continues to store the clutch actuator position and the electric machine torque to RAM. By storing the electric machine torque and clutch actuator position to RAM, the controller may generate a relationship as shown in FIG. 2. This relationship may then be applied at 430 to adjust the plate clutch torque capacity and the clutch actuator. Method 400 proceeds to 460.

At 460, method 400 judges if electric machine torque is greater than a threshold torque. In one example, the threshold torque is a function of the parking pawl or other device that is restricting motion of the transmission output shaft. For example, if the parking pawl is rated for 400 Nm, the threshold torque may be limited to less than 200 Nm. If method 400 judges that electric machine torque is greater than the threshold torque, method 400 proceeds to exit. Method 400 may adjust the clutch actuator to open the plate clutch at a predetermined rate when exiting. Further, method 400 may determine a position of that the clutch actuator at which the plate clutch stops transferring torque to the transmission output shaft when the plate clutch is being opened. In one example, the position at which the plate clutch stops transferring torque to the transmission output shaft when the plate clutch is being opened may be determined when electric machine torque decreases by more than a predetermined amount while the clutch actuator is being opened. The clutch actuator position and the electric machine torque may be recorded to RAM to update the relationship shown in FIG. 2 during the release of the plate clutch.

The amount of torque that is transferred via the plate clutch (e.g., clutch torque capacity) may be determined by subtracting the torque of the electric machine as determined from electric machine electric current after the electric machine reaches the predetermined speed at step 448 from the electric machine torque determined at steps 452-460. The plate clutch torque capacity may be stored and plotted as shown in FIG. 2.

At 408, method 400 judges if the vehicle is decelerating and if the sprag clutch locking ring is disengaged (e.g., the sprag clutch is permitted to overrun). If so, the answer is yes and method 400 proceeds to 410. Otherwise, the answer is no and method 400 proceeds to exit. Method 400 may characterize the plate clutch during deceleration conditions so that the characterization may not noticeably interfere with vehicle operation. Method 400 also holds the locking ring disengaged if method 400 proceeds to 410.

At 410, method 400 judges if the plate clutch is fully closed. Method 410 may judge that the plate clutch is fully closed based on a position of the clutch actuator. If method 400 judges that the plate clutch is fully closed, the answer is yes and method 400 proceeds to 412. Otherwise, the answer is no and method 400 proceeds to 50.

At 470, method 400 judges if the plate clutch is fully opened and if the sprag clutch is overrunning. Method 410 may judge that the plate clutch is fully opened based on a position of the clutch actuator. Method 400 may judge that the sprag clutch is overrunning if a speed of a transmission input shaft multiplied by a first gear ratio is less than a speed of a transmission output shaft. If method 400 judges that the plate clutch is fully opened and the sprag clutch is overrunning, the answer is yes and method 400 proceeds to 472. Otherwise, the answer is no and method 400 proceeds to exit.

At 472, method 400 operates the electric machine in a regeneration mode. Alternatively, the electric machine may be operated in a speed control mode at a predetermined speed. The electric machine is rotating in a forward direction (e.g., clockwise). Method 400 proceeds to 474.

At 474, method 400 begins to adjust the clutch actuator to a position where the plate clutch will be fully closed at a predetermined rate (e.g., rotating the clutch actuator at 20 degrees/second or moving the clutch actuator at 2 millimeters/second). In other words, the clutch actuator is moved from a direction where the clutch actuator will fully open the plate clutch to a position where the clutch actuator will fully close the plate clutch at a predetermined rate. Method 400 proceeds to 476.

At 476, method 400 judges whether or not electrical current output from the electric machine operating in a regeneration mode exceeds a threshold amount. Alternatively, if the electric machine is operating in a speed control mode, method 400 may judge if the amount of torque generated by the electric machine has increased or decreased by more than a threshold amount. If so, the answer is yes and method 400 proceeds to 478. Otherwise, the answer is no and method 400 returns to 474.

At 478, method 400 records the clutch actuator position at the time the electric machine electric current output increased by the threshold amount, or alternatively, the clutch actuator position at the time the electric machine torque output change by more than a threshold amount of torque. The recorded clutch actuator positions may be estimates of the clutch "kiss" position. Method 400 proceeds to 420.

At 420, method 400 ceases clutch characterization and updates a clutch characterization that is stored in RAM. The new clutch characterization may be applied at 430 to operate the clutch. Method 400 proceeds to exit.

At 412, method 400 operates the electric machine in a regeneration mode. The electric machine is rotating in a forward direction (e.g., clockwise). Method 400 proceeds to 414.

At 414, method 400 begins to adjust the clutch actuator to a position where the plate clutch will be fully opened at a predetermined rate (e.g., rotating the clutch actuator at 20 degrees/second or moving the clutch actuator at 2 millimeters/second). In other words, the clutch actuator is moved from a direction where the clutch actuator will fully close the plate clutch to a position where the clutch actuator will fully open the plate clutch at a predetermined rate. Method 400 proceeds to 416.

At 416, method 400 judges whether or not electrical current output from the electric machine operating in a regeneration mode has decreased by more than a threshold amount. Alternatively, method 400 may judge if the amount of electrical current output from the electric machine is less than a threshold amount. If so, the answer is yes and method 400 proceeds to 418. Otherwise, the answer is no and method 400 returns to 414.

At 418, method 400 records the clutch actuator position at the time the electric machine electric current output decreased by the threshold amount. Alternatively, method 400 records the clutch actuator position at a time when the output current of the electric machine is less than a threshold amount of electrical current. The recorded clutch actuator position may be the estimate of the clutch "kiss" position. Method 400 proceeds to 420.

In this way, a relationship between a plate clutch and a clutch actuator may be determined and stored to controller memory. The relationship may then be used as a basis for operating the plate clutch and the clutch actuator to deliver smooth gear shifts.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle powertrain, comprising:

adjusting a relationship between a clutch actuator position and a torque capacity of a clutch in response to an amount of torque generated via an electric machine being greater than a threshold;

operating the clutch according to the relationship;

closing the clutch from a fully opened position during vehicle deceleration while storing the clutch actuator position and the torque capacity of a clutch to memory.

2. The method of claim 1, where the electric machine is operated in a regeneration mode.

3. The method of claim 1, further comprising overrunning a sprag clutch and holding a locking ring of the sprag clutch disengaged.

4. The method of claim 1, where closing the clutch includes adjusting a position of a clutch actuator at a predetermined rate.

5. The method of claim 1, where the vehicle powertrain is an electric vehicle powertrain.

* * * * *